United States Patent
Panesar et al.

(10) Patent No.: US 7,774,794 B2
(45) Date of Patent: Aug. 10, 2010

(54) METHOD AND SYSTEM FOR MANAGING BANDWIDTH IN A VIRTUALIZED SYSTEM

(75) Inventors: Kiran Panesar, Hillsboro, OR (US); Michael Goldsmith, Lake Oswego, OR (US); Sanjay Kumar, Atlanta, GA (US); Philip Lantz, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 1389 days.

(21) Appl. No.: 11/207,544

(22) Filed: Aug. 19, 2005

(65) Prior Publication Data

US 2007/0044108 A1    Feb. 22, 2007

(51) Int. Cl.
- G06F 9/44 (2006.01)
- G06F 13/00 (2006.01)
- G06F 9/455 (2006.01)
- G06F 9/46 (2006.01)
- G06F 3/00 (2006.01)
- G06F 5/00 (2006.01)

(52) U.S. Cl. .......................... 719/321; 718/1; 718/104; 710/36; 710/107

(58) Field of Classification Search ................ 719/321; 718/1, 104; 710/36, 107
See application file for complete search history.

(56) References Cited

U.S. PATENT DOCUMENTS

| 7,093,035 | B2 * | 8/2006 | Hashimoto | 710/36 |
|---|---|---|---|---|
| 7,136,800 | B1 * | 11/2006 | Vega | 703/23 |
| 7,260,820 | B1 * | 8/2007 | Waldspurger et al. | 718/1 |
| 7,290,259 | B2 * | 10/2007 | Tanaka et al. | 718/1 |
| 7,299,468 | B2 * | 11/2007 | Casey et al. | 718/104 |
| 7,519,745 | B2 * | 4/2009 | Hashimoto | 710/36 |
| 7,580,826 | B2 * | 8/2009 | Vega et al. | 703/24 |
| 2006/0212870 | A1 * | 9/2006 | Arndt et al. | 718/104 |

OTHER PUBLICATIONS

U.S. Appl. No. 11/207,495, filed Aug. 19, 2005, Panesar, et al.
U.S. Appl. No. 11/207,545, filed Aug. 19, 2005, Panesar, et al.

* cited by examiner

*Primary Examiner*—Qing-Yuan Wu
(74) *Attorney, Agent, or Firm*—Blakely, Sokoloff, Taylor & Zafman LLP

(57) ABSTRACT

A method of improving USB device virtualization to prevent bus bandwidth from being over allocated when isochronous USB devices are attached to multiple virtual machines by attaching a dummy device to each virtual machine which will mimic the bandwidth reservations made by real devices in other virtual machines, thus allowing each virtual machine to determine the true available bandwidth. The dummy devices are represented by incorporating a dummy device driver in each virtual machine and emulating the dummy device in software in the VMM.

15 Claims, 4 Drawing Sheets

METHOD AND SYSTEM FOR MANAGING BANDWIDTH IN A VIRTUALIZED SYSTEM

BACKGROUND OF THE INVENTION

1. Field of the Invention

The present invention relates to virtualization, specifically, virtualization support for isochronous Universal Serial Bus (USB) devices.

2. Description of the Related Art

Virtualization is a technique in which a computer system is partitioned into multiple isolated virtual machines (VMs), each of which appears to the software within it to be a complete computer system. The software running within each VM—including the operating system in the VM—may be unaware of any of the other VMs, or even that the computer system is partitioned. The virtual machine monitor (VMM) is responsible for providing the environment in which each VM runs and maintaining isolation between the VMs. FIG. 1 shows an example of a typical virtualized computer system.

Each virtual machine has access to a set of devices, which may be virtual devices or physical devices. These devices include controllers for secondary busses. The VMM controls which physical devices/controllers are assigned to each VM, and also implements the virtual devices are visible to VMs. If a physical device is exclusively assigned to a single virtual machine, it is not available to the other virtual machines. In current practice, if a device needs to be shared by more than one VM, the VMM typically implements a virtual device for each VM, and arbitrates access of the virtual devices to the physical device. The implementation of the virtual devices and the arbitration of access to the physical device adds overhead and reduces the performance of both the computer system and the device. Also, the virtual device typically defines a different more limited interface and functionality than the physical device.

USB 2.0 (Universal Serial Bus Revision 2.0 Specification, published 2002) is an external bus that supports data rates of up to 480 Mbps. USB 2.0 is an extension of USB 1.1 (Universal Serial Bus Revision 1.1 Specification, published 1996) and is fully compatible with USB 1.1. Current virtualization software solutions provide limited support for USB 2.0. For example, existing virtualization software solutions do not support isochronous devices nor do they support more than two devices on USB 2.0 per VM.

In the case of a bus handling communication with multiple devices, such as USB, the VMM may wish to assign individual devices on the bus to specific VMs, to avoid the problems associated with virtualizing the devices. However, the bus controller (in the case of USB, the host controller) is used to communicate with all devices on the bus, so it cannot be assigned to any single VM. The bus controller must be virtualized in a way that allows each VM to use it to communicate with the devices on the bus that are assigned to that VM.

This invention addresses one of the problems that arises in virtualizing USB, which is that each VM incorrectly assumes that it owns the full USB bandwidth, because it is not aware of the other VMs. Hence, bandwidth may be over allocated.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

The current application may utilize embodiments depicted in related applications Ser. Nos. 11/207,495 and 11/207,545, filed on Aug. 19, 2005. U.S. patent application Ser. No. 11/207,495 is entitled "A Method And System For Replicating Schedules For Virtualization" with with inventors: Kiran Panesar, Philip Lantz, Rajesh Madukkarumukumana; U.S. patent application Ser. No. 11/207,545 is entitled "A Method and System for Device Address Translation for Virtualization" with inventors: Kiran Panesar and Philip Lantz. Another related application Ser. No. 11/207,288, also filed on Aug. 19, 2005 is titled "Method and Apparatus for Supporting Universal Serial Bus Devices in a Virtualized Environment" with inventors Kiran Panesar, Sanjay Kumar, Abdul R Ismail and Philip Lantz. U.S. patent application Ser. No. 11/207,288 describes software techniques for assigning USB devices to VMs.

The method described in this invention solves the problem of bandwidth allocation by introducing dummy devices into each VM which allocate the bandwidth corresponding to physical devices attached to other VMs. As previously described, each legacy VM incorrectly assumes that it owns the full USB bandwidth, because it is not aware of the other VMs. Using this method, when a real device reserves bus bandwidth, the corresponding dummy devices reserve an equivalent amount of bandwidth in their respective VM schedules. Thus, the operating system software in each VM is aware of the total bus bandwidth reserved in the system, and will not attempt to allocate more than the remaining bandwidth.

Figure 1:
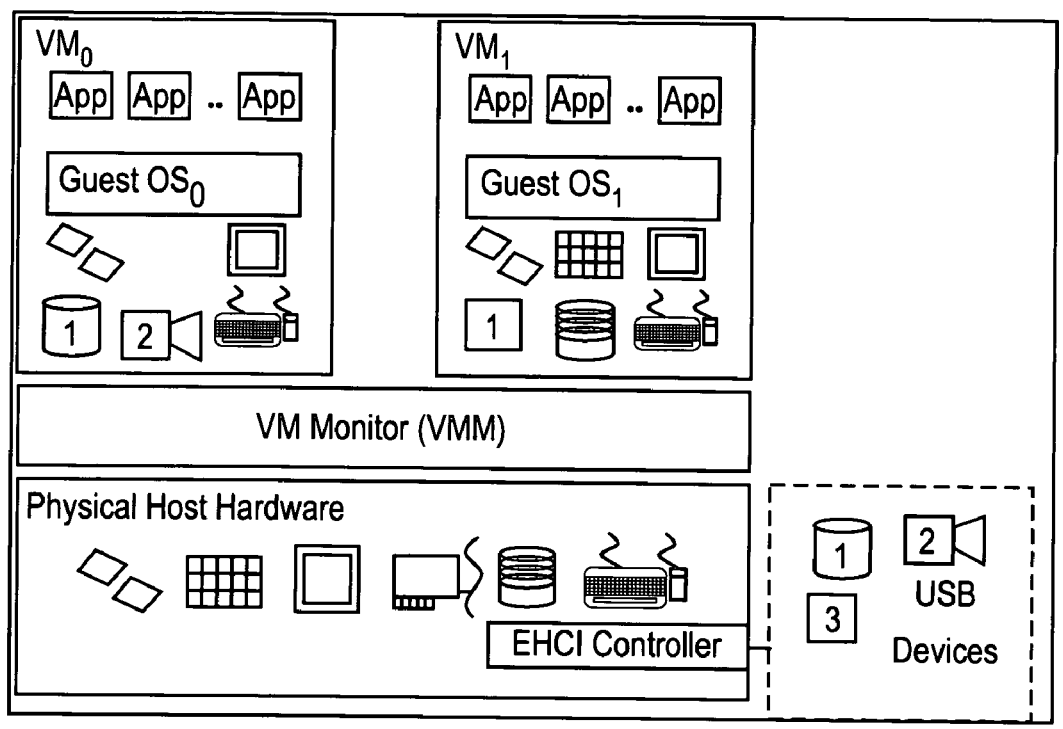
FIG. 1 is a typical virtualized computer system.
Figure 2:
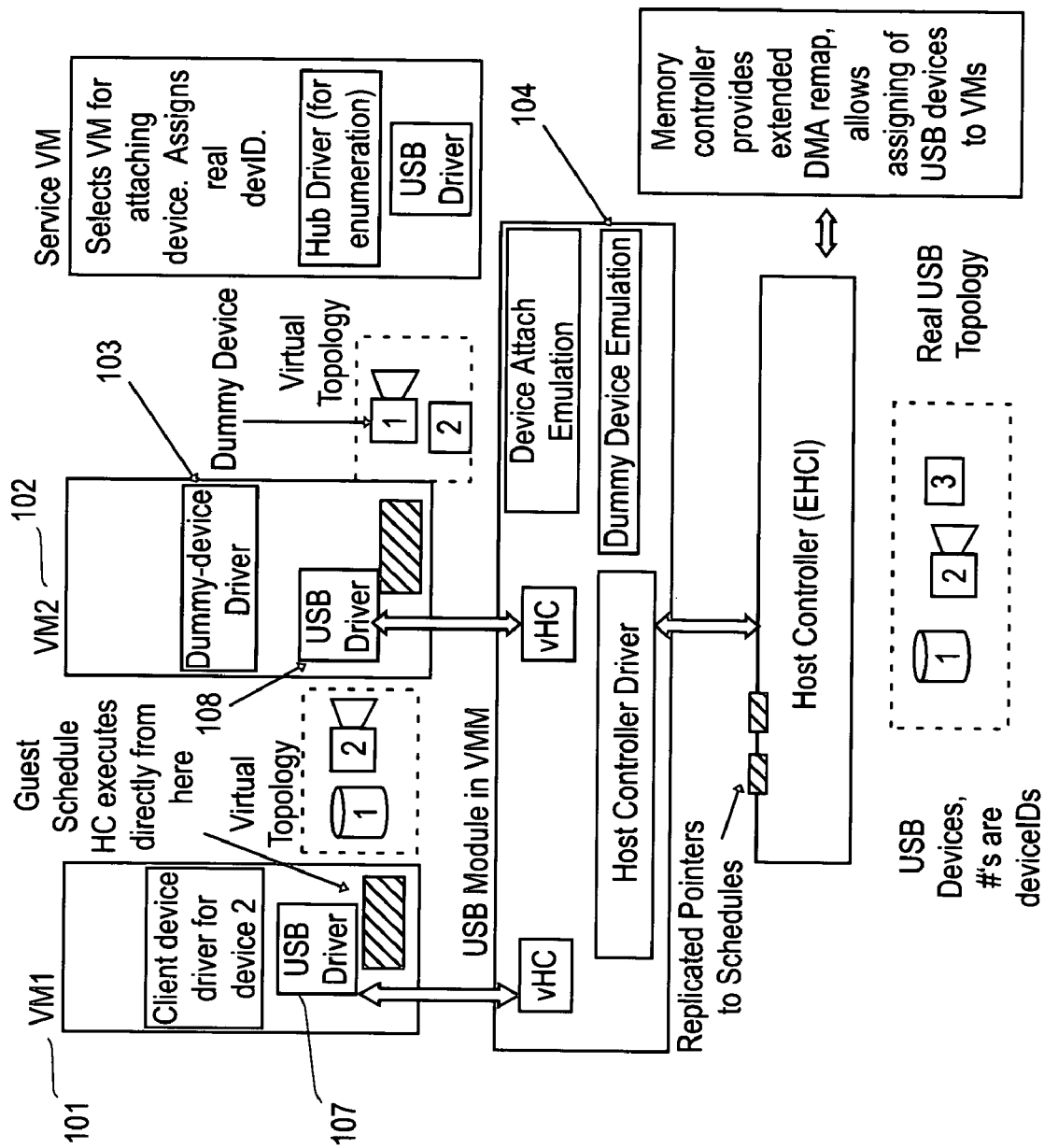
FIG. 2 is a virtualized computer system as utilized by one embodiment of the claimed subject matter.

FIG. 2 is a virtualized computer system as utilized by one embodiment of the claimed subject matter. In this embodiment, each virtual machine (VM1 and VM2) 101 and 102 has a USB driver 107 and 108, respectively, that communicates with its respective Host Controller (vHC) in the shaded box indicated as USB module in VMM. When a real device is assigned to a VM, a corresponding dummy device is instantiated for each of the other VMs. The dummy devices are implemented in the VMM (104) and cause a corresponding dummy device driver (103) to be loaded in the virtual machine.

In one embodiment, the VMM monitors control TDs to determine if a device driver is allocating bandwidth for a real device. Bandwidth allocation occurs when opening a USB endpoint. When the VMM detects a change in bandwidth allocation by a device in one VM, the dummy device for each of the other VMs notifies the corresponding dummy device driver in the VM. In this example, dummy device 104 notifies dummy device driver 103 in virtual machine 2 (VM2). The dummy device driver 103 then requests bandwidth reservation from the USB driver 108. The dummy device driver 103 opens an endpoint that is handled by the dummy device emulation 104 in the VMM. The dummy-device endpoint that has been opened results in blocking off bandwidth in other USB drivers within that VM. After bandwidth is reserved, the dummy-device drivers do not schedule any further transfer descriptors. Hence, they do not actually schedule isochronous traffic.

In another embodiment, the host controller manages bandwidth by analyzing endpoint configurations and monitoring open endpoint requests to determine an amount of allocated bandwidth. The host controller provides the bandwidth information to the VM USB driver. In one embodiment, a register stores the amount of allocated bandwidth and is updated by the host controller. Host Controller may include a register that indicates the bandwidth that has already been allocated. This register is updated by the VMM or the HC, and is available read-only for the VMs.

In one embodiment, the VMM introduces a single dummy device into each VM. This dummy device allocates the aggregate bandwidth used by real devices in all the other VMs. In another embodiment, the VMM introduces a separate dummy device into each VM for each real device that may allocate bandwidth. Each dummy device allocates bandwidth within its VM equal to the bandwidth allocated by the corresponding real device in another VM.

Figure 3:
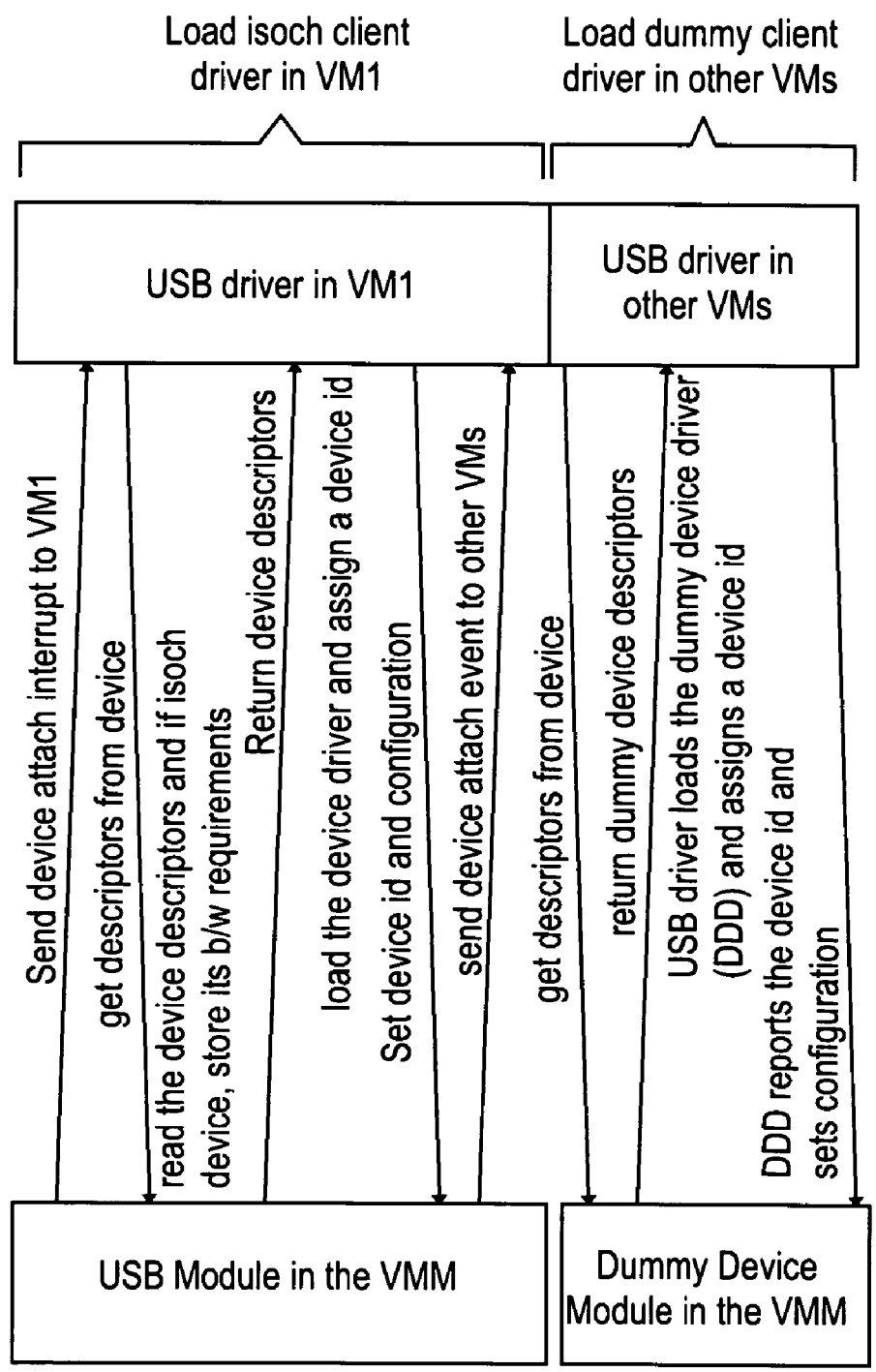
FIG. 3 is a flowchart of a method utilized by one embodiment of the claimed subject matter for setting up the dummy devices in the VMM and the dummy device drivers in the other VMs when a new physical device is attached to one VM.

FIG. 3 is a flowchart of a method utilized by one embodiment of the claimed subject matter for setting up the dummy devices in VMM and the dummy device drivers in the other VMs when a new physical device is attached to one VM. The flowchart depicts the USB module in the VMM sending a device attach interrupt to VM1. VM1 requests descriptors from the device and the device descriptors are returned. In the VM, the device driver is loaded and a device identifier is assigned. The VM sets the device identifier and configuration. The VMM then sends a device attach event to the other virtual machines. As each of the other VMs requests device descriptors, the VMM returns descriptors for the dummy device. Each of the other VMs then loads the dummy device driver and sets the device id and configuration.

Figure 4:
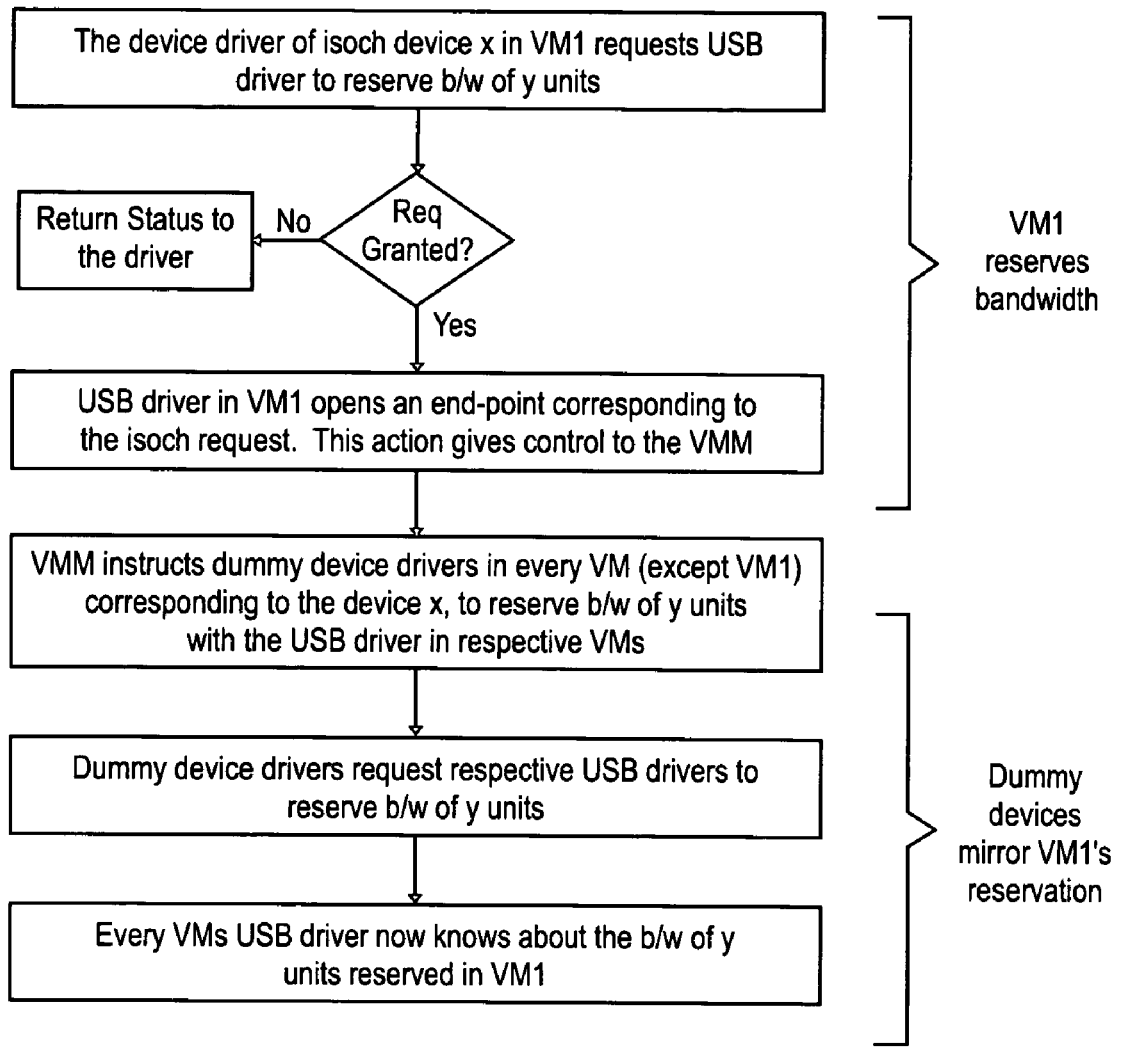
FIG. 4 is a flowchart of a method utilized by one embodiment of the claimed subject matter for using the dummy devices to allocate bandwidth in the other VMs when bandwidth is reserved for a physical device by one VM.

FIG. 4 is a flowchart of a method utilized by one embodiment of the claimed subject matter for using the dummy devices to allocate bandwidth in the other VMs when bandwidth is reserved for a physical device by one VM. First, the device driver of isochronous device x in VM1 requests the USB system driver to reserve bandwidth of y units. If the request is granted, the USB system driver in VM1 opens an end-point corresponding to the isochronous request. This action gives control to the VMM. Subsequently, the VMM instructs the dummy device drivers corresponding to the device x in every VM except VM1 to reserve bandwidth of y units with the USB system driver in their respective VMs. Next, the dummy device drivers request their respective USB system drivers to reserve bandwidth of y units. Hence, every VM's USB system driver now knows about the bandwidth of y units reserved in VM1.

Another use of dummy devices is in topology virtualization. Here dummy devices are attached for all physical devices, regardless of whether they are isochronous devices or not. The effect is that all VMs see the same USB topology, which is the same as the real USB tree. Hence USB drivers in each VM assign the same device number to devices. There is no need for the host controller or the VMM to virtualize USB device IDs.

The claimed subject matter depicted in the previous Figures and Tables may be implemented in software. For example, the software may be stored in an electronically-accessible medium that includes any mechanism that stores content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; and flash memory devices.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method for managing bandwidth when attaching a real Universal Serial Bus (USB) device to a virtualized system comprising:
    assigning the real USB device to one of a plurality of virtual machines within the virtualized system;
    causing a dummy device to be instantiated for each of the plurality of virtual machines within the virtualized system other than the virtual machine to which the real USB device has been assigned as a result of the assignment;
    causing a dummy device driver to be loaded in each of the plurality of virtual machines within the virtualized system other than the virtual machine to which the real USB device has been assigned, each loaded dummy device driver corresponding to an instantiated dummy device;
    notifying each of the dummy device drivers by its corresponding dummy device upon a change in bandwidth allocation by the real USB device within the virtual machine to which the real USB device has been assigned; and
    causing the dummy device driver in each virtual machine to request bandwidth reservation within its corresponding virtual machine by conveying the notification from the corresponding dummy device to each of the dummy device drivers.

2. The method of claim 1, wherein a single dummy device driver is loaded into each virtual machine.

3. The method of claim 1, wherein a separate dummy device driver is loaded into each virtual machine for each real USB device that may request bandwidth reservation.

4. The method of claim 1, wherein the dummy device drivers only request bandwidth but do not schedule any data transfers.

5. The method of claim 1, wherein the real USB device requests isochronous bandwidth.

6. The method of claim 5, wherein the real USB device is a real isochronous device.

7. The method of claim 6, wherein the real isochronous device is either one of a camera, speaker, or audio/video device.

8. A method for managing bandwidth when attaching a real isochronous device to a virtualized system comprising:
    loading a device driver for the real isochronous device in a first virtual machine within the virtualized system, wherein the real isochronous device is assigned to the first virtual machine;
    causing a dummy device to be instantiated for each of a plurality of virtual machines within the virtualized system other than the first virtual machine;

causing a dummy device driver to be loaded in each of the plurality of virtual machines within the virtualized system other than the first virtual machine, each loaded dummy device driver corresponding to an instantiated dummy device;

notifying each of the dummy device drivers by its corresponding dummy device upon a change in bandwidth allocation by the real isochronous device within the first virtual machine; and causing the dummy device driver in each virtual machine to request bandwidth reservation within its corresponding virtual machines by conveying the notification from the corresponding dummy device to each of the dummy device drivers.

9. The method of claim 8, wherein a single dummy device is created for each virtual machine.

10. The method of claim 8, wherein a separate dummy device is created for each virtual machine for each real isochronous device that may request bandwidth reservation.

11. The method of claim 8, wherein the real isochronous device requests isochronous bandwidth.

12. The method of claim 8, wherein the real isochronous device is a real isochronous USB device.

13. The method of claim 12, wherein the real isochronous USB device is one of a camera, speaker, audio, or video device.

14. An article of manufacture comprising a non-transitory machine-readable medium having a plurality of machine readable instructions, wherein when the instructions are executed by a system with a plurality of virtual machines, the instructions manage bandwidth by:

causing a device driver to be loaded in a first virtual machine in the plurality of virtual machines in response to detection of a real device, wherein the real device is assigned to the first virtual machine;

causing a dummy device to be instantiated for each of the plurality of virtual machines within the virtualized system other than the first virtual machine;

causing a dummy device driver to be loaded in each of the plurality of virtual machines other than the first virtual machine in response to detection of the real device, each loaded dummy device driver corresponding to an instantiated dummy device;

notifying each of the dummy device drivers by its corresponding dummy device upon a change in bandwidth allocation by the real device within the first virtual machine; and causing the dummy device driver in each virtual machine to request bandwidth reservation within its corresponding virtual machine by conveying the notification from the corresponding dummy device to each of the dummy device drivers.

15. The article of manufacture of claim 14, wherein the instructions further emulate a dummy device.

* * * * *